US011332977B2

(12) United States Patent
Ellement

(10) Patent No.: US 11,332,977 B2
(45) Date of Patent: May 17, 2022

(54) VEHICLE ACCESS DEVICE MOUNTED HOLDER FOR EQUIPMENT

(71) Applicant: BARJOH PTY LTD, Oakford, WA (US)

(72) Inventor: Nathan Ellement, Armadale (AU)

(73) Assignee: Barjoh Pty Ltd, Oakford (AU)

( * ) Notice: Subject to any disclaimer, the term of this patent is extended or adjusted under 35 U.S.C. 154(b) by 0 days.

(21) Appl. No.: 16/016,268

(22) Filed: Jun. 22, 2018

(65) Prior Publication Data
US 2018/0313151 A1 Nov. 1, 2018

Related U.S. Application Data

(63) Continuation of application No. PCT/AU2016/051261, filed on Dec. 20, 2016.

(30) Foreign Application Priority Data

Dec. 22, 2015 (AU) .............................. 2015905321

(51) Int. Cl.
| E06C 7/00 | (2006.01) |
| E06C 7/14 | (2006.01) |
| B60R 3/02 | (2006.01) |
| B60R 11/06 | (2006.01) |
| E06C 5/44 | (2006.01) |
| E06C 5/14 | (2006.01) |
| B60R 11/00 | (2006.01) |
| E06C 5/04 | (2006.01) |

(52) U.S. Cl.
CPC .................. *E06C 7/14* (2013.01); *B60R 3/02* (2013.01); *B60R 11/06* (2013.01); *E06C 5/14* (2013.01); *E06C 5/44* (2013.01); *B60R 2011/004* (2013.01); *E06C 5/04* (2013.01)

(58) Field of Classification Search
CPC ..................................... E06C 5/02; E06C 5/04
USPC .......... 248/210, 235, 238; 182/97, 115, 116, 182/127
See application file for complete search history.

(56) References Cited

U.S. PATENT DOCUMENTS

| 4,905,950 A * | 3/1990 | Turner .................... A62C 13/78 24/273 |
| 5,803,208 A | 9/1998 | Blach |
| 7,287,735 B2 * | 10/2007 | Heerdt .................... A62C 13/78 169/51 |

(Continued)

FOREIGN PATENT DOCUMENTS

| DE | 1784311 A1 | 8/1971 |
| EP | 2481275 A1 | 12/2011 |

(Continued)

*Primary Examiner* — Steven M Marsh
(74) *Attorney, Agent, or Firm* — Levine Bagade Han LLP

(57) ABSTRACT

An equipment holder for mounting on an access device of a vehicle, such as on a side rail of a retractable stair or ladder of the vehicle. The holder can be configured to hold one or more wheel chocks and/or one or more fire extinguishers. The holder can be mounted by a unique mounting bracket. Other equipment may be carried in the holder e.g. one or more radio communications handsets, first aid equipment, protective clothing (such as a hard hat, weatherproof jacket) or a tool kit, or combinations of two or more thereof. The holder can include a cradle or rack mounted to the access device by the mounting bracket.

20 Claims, 6 Drawing Sheets

(56) References Cited

U.S. PATENT DOCUMENTS

| | | | | |
|---|---|---|---|---|
| 10,533,374 B2 * | 1/2020 | Jevaney | ................. | E06C 7/182 |
| 2003/0173153 A1 * | 9/2003 | Hedley | ................. | B63B 27/146 |
| | | | | 182/97 |
| 2009/0038885 A1 * | 2/2009 | Ellement | ................. | B60R 3/02 |
| | | | | 182/97 |
| 2012/0247871 A1 | 10/2012 | Mickens | | |
| 2013/0008743 A1 * | 1/2013 | Hedley | ................. | E06C 1/393 |
| | | | | 182/95 |
| 2014/0169921 A1 | 6/2014 | Carey | | |
| 2015/0136523 A1 * | 5/2015 | Madera | ................. | B60R 3/02 |
| | | | | 182/113 |

FOREIGN PATENT DOCUMENTS

| | | |
|---|---|---|
| JP | 1994-079649 U | 11/1994 |
| JP | 2002-029317 | 1/2002 |
| JP | 2009-517265 | 4/2009 |
| WO | WO 2011/100794 | 8/2001 |
| WO | WO 2007/062464 | 6/2007 |
| WO | WO 2011/116415 | 9/2011 |
| WO | WO 2017/106910 | 6/2017 |

\* cited by examiner

VEHICLE ACCESS DEVICE MOUNTED HOLDER FOR EQUIPMENT

CROSS-REFERENCE TO RELATED APPLICATIONS

This application is a continuation of International Application No. PCT/AU2016/051261, filed Dec. 20, 2016, which claims priority to Australian Application No. 2015905321, filed Dec. 22, 2015, both of which are incorporated by reference herein in their entireties.

FIELD OF THE INVENTION

The present invention relates to a holder mounted on a vehicle access device.

The present invention finds particular application to, though not solely limited to, a holder for portable equipment for use relating to a vehicle, the holder provided on a deployable/retractable access stair or ladder of a vehicle.

BACKGROUND

Commercial and industrial vehicles carry safety and/or operational equipment for use with the vehicle or for operational use at a work site.

For example, commercial and industrial vehicles often carry portable fire extinguishers to deal with vehicle fires, vehicle load fires and fires in areas adjacent the vehicle as a first response.

In the event that a vehicle is safely stabled, or when it has failed or requires servicing/maintenance, wheel chocks are often used under its rubber tyres to ensure that the vehicle does not roll away before it is recued, repaired or otherwise returned to service.

For example, larger commercial and industrial vehicles, such as 'haul packs' (also known as dump trucks), water carts and other large truck type vehicles, can carry wheel chocks to help ensure that the vehicle does not move whilst stationary. For example, maintenance or fueling may be in progress on the vehicle, and the wheel chocks help to ensure a driver does not unintentionally move the vehicle whilst such servicing is in progress.

Likewise, if the vehicle has failed, particularly on a slope, wheel chocks are used to augment the brake system to help ensure that the vehicle does not move.

Such large vehicles may have a deployable access device, such as a pivoted or hinged or sliding stair or ladder.

An example of a pivotably deployable/retractable access device is disclosed in international (PCT) patent application number PCT/AU2006/001807 published as WO 2007/062464, the entire contents of which is incorporated herein by reference.

A collapsible (nesting) alternative type of deployable/retractable access device is disclosed in international (PCT) patent application number PCT/AU2011/000323 published as WO 2011/116415, the entire contents of which is incorporated herein by reference.

Such deployable access devices are typically automatically deployed for use when the vehicle is at a stand and the parking brake is applied. This ensures that the access device is deployed if the driver needs to disembark from the vehicle, particularly in an emergency e.g. if the vehicle has an engine, electrical or hydraulic systems fire.

When the vehicle is ready to be moved, the access device is automatically retracted. This practice ensures that the stair or ladder is safely stowed out of the way adjacent the vehicle whilst the vehicle is moving, which helps to prevent damage to the access device, personnel on the ground and other vehicles/infrastructure.

Wheel chocks are known to be stored on a hanger on the front or rear of a haul pack type truck used in mining operations. The hanger is provided by a rail onto which the wheel chocks are slid via a hole passing through each wheel chock. A retaining pin or clip can be applied to each end of the hanger rail to prevent each chock form sliding off the hanger rail, particularly when the vehicle is travelling over rough terrain and/or cornering. Such clips/pins are a safety device, though they are often lost or simply forgotten or ignored and are not used.

Having the wheel chocks hanging at the front or rear of the vehicle exposes them to dirt and risk of damage from impact or other operations at or adjacent the vehicle. For example, such wheel chocks hanging at the rear of a water cart suffer periodic soaking with water when the water cart spray system is in operation. If the wheel chocks are needed quickly, they can be slippery wet, and therefore an injury risk for personnel trying to use the wheel chocks.

Also, having the wheel chocks hanging at the front or rear of the vehicle means that they have to be relatively high from the ground, at least over waist height, to prevent impact with the ground as the vehicle travels. Each wheel chock for larger vehicles can weigh upward of 10 kg, such as for use with a 150 tonne dump truck. This means that users risk back and leg/knee injury lifting the wheel chocks off and back onto the hanger rail or out and into the pocket holders, particularly on uneven, wet or dusty ground.

Likewise, other equipment, such as fire extinguishers need to be readily available for rapid/emergency use at ground level. However, it is vital that such safety equipment remains clean and protected until needed. Often such equipment is stored in external cabinets closer to ground level on the vehicle. However, such cabinets take time to access, thereby risking delay.

An alternative is to store the fire extinguisher or other safety equipment in an open rack closer to ground level, usually retained by a strap or other releasable safety retainer. The vehicle's operator has to know where on the vehicle such equipment is positioned. Ground personnel unfamiliar with that specific vehicle may not know where the safety equipment is stored.

Dry powder fire extinguishers are often stowed for ready availability to use on vehicle fires. Dry powder is preferred to help extinguish inflammable liquid fires, such as oil, fuel and hydraulic fluid fires. Dry powder can be laid down as a layer to smother the burning liquid, cutting off the supply of oxygen required to maintain the flames. However, it has been realised that dry powder portable fire extinguishers lay or stand unused for many weeks or months. Vibration and movement of the vehicle causes the static powder to compact. When the dry powder fire extinguisher is needed, the compacted powder may not be sufficiently fluid to be expelled from the extinguisher when the extinguisher is activated. This is a severe safety risk.

It is with such problems in mind that the present invention has been developed.

It has been found desirable to provide a readily accessible equipment holder for use on a vehicle.

It has been further found desirable to provide an equipment holder for use on an access device mounted to a vehicle.

SUMMARY

With the aforementioned in mind, an aspect of the present invention provides a holder on a deployable and retractable access device for a vehicle, the holder providing stowage for portable equipment, the holder moving with deployment and retraction of the access device in use.

Advantageously, the holder makes the equipment readily accessible from the ground when the access device is deployed, and stows the equipment safely away from contamination and damage at ground when the access device is fully retracted.

Preferably the holder includes at least one first retainer for the equipment such that when the access device is in the deployed position the equipment is retained until the at least one first retainer is bypassed or released.

Preferably the holder includes at least one second retainer for the equipment such that when the access device is in the retracted position the equipment is retained until the at least one second retainer is bypassed or released.

Preferably the at least one first retainer is also the at least one second retainer.

The at least one first retainer may include at least one elongate member extending across an access region of the holder for accessing the equipment to remove the equipment from the holder.

Preferably the at least one elongate member includes at least one bar, beam, rod or mesh barrier.

The at least one first retainer and/or the at least one second retainer may include at least one projection preventing the equipment from sliding out from the holder.

The at least one respective projection may be bypassed or overcome by a user lifting the equipment clear of the respective at least one projection to remove the equipment from the holder.

According to one or more embodiments of the present invention, the holder may invert or move to side down position with the access device as the access device rotates from a downward and outward deployed position with respect to the vehicle to a retracted position for stowage.

Preferably the access device rotates from the downward and outward deployed position to an inverted retracted position.

Alternatively, for access device stowage lying sideways alongside the vehicle when fully retracted, the holder will transition to the side down position.

The equipment may include, for example, at least one wheel chock, at least one fire extinguisher, at least one first aid kit, at least one communication device (such as a two way radio), or a combination of two or more thereof.

It will be appreciated that a dry powder fire extinguisher retained in the holder will move through the retracted position to the deployed position and back again each time the access device is deployed and subsequently retracted, and vice versa. Consequently, the dry powder is regularly encouraged to move within the body of the extinguisher. This maintains the dry powder in a loose, fluid condition and reduces the risk of compaction. The extinguisher is beneficially more reliable.

The holder may include a bracket for mounting to the access device. The bracket may include fastening points allowing the holder to be fastened to a side of the access device.

The holder may include a releasable tie-down or strap for firmly restraining the equipment.

The holder may be fabricated from sheet metal and/or bar or entirely or partly pressed from sheet metal and optional have parts welded or otherwise fastened thereto, such as by bolting.

Alternatively, the holder may be formed of plastic, such as by injection or roto-moulding (rotational moulding), or fabricated from plastic components, such as by thermal bonding/welding, or a combination of such manufacturing techniques.

The holder may be formed of a combination of metal and plastic components.

The holder may include a cradle, rack or storage container within which the equipment is stored. The cradle, rack or storage container may be fully enclosed, such as with a hinged lid, or may be open fronted or open topped, or both open fronted and open topped, and may preferably have partially exposed sides, so that the equipment can be viewed for presence, amount, correct position etc. whilst in the holder.

The holder may include a cassette type arrangement whereby the equipment is held in an insert holder which mounts into/onto a main support frame of the holder.

The holder may be attached to the access device by a rotation mechanism, allowing the holder to rotate relative to the access device as the access device deploys and/or retracts. Therefore, the holder may remain the same way up during deployment and/or retraction of the access device. Such an arrangement may be beneficial for applications where inversion or sideways lying retraction is not preferred.

The rotation mechanism may include a gravity responsive rotary joint arrangement, whereby the centre of gravity of the holder (which may be determined to be either excluding or including the equipment) dictates the upward orientation of the holder. Alternatively, a powered rotary joint arrangement may be provided, which may be preferred with relatively heavy equipment stored in the holder.

The holder may include a main support structure, such as a support frame, for mounting to the access device, and an equipment support structure for receiving and releasably retaining the equipment.

For example, the main support structure can be mounted to a bracket on the access device or may include the bracket to mount the main support structure to the access device.

The main support structure may include the at least one first retainer and/or the at least one second retainer for retaining the equipment.

The equipment support structure may be removable from the main support structure. Thus, the equipment may be interchanged for replacement equipment, such as replacing the fire extinguisher in a cradle with a recently tested fire extinguisher.

The main support structure may receive interchangeable equipment support structures, whereby; the type equipment to be retained by the holder is interchangeable using the same main support structure.

Thus, the present invention may provide a modular system wherein the type of equipment or alternative number of the same equipment may be interchanged and retained in a main support structure mounted to the access device.

The equipment support structure may include a base and at least one side positioned retainer.

A latch and release mechanism may be provided to releasably attach the equipment support structure to the main support structure.

BRIEF DESCRIPTION OF THE DRAWINGS

One or more embodiments of the present invention will hereinafter be described with reference to the accompanying Figures, of which:

FIGS. 1 to 4 show the access device in a deployed orientation, FIG. 4 shows the wheel chock partially removed from the holder. FIGS. 5 to 7 show the access device in a retracted orientation.

FIGS. 8 to 10 show the access device in a deployed orientation, and FIGS. 11 to 13 show the access device in a retracted orientation.

DETAILED DESCRIPTION

Figure 1:
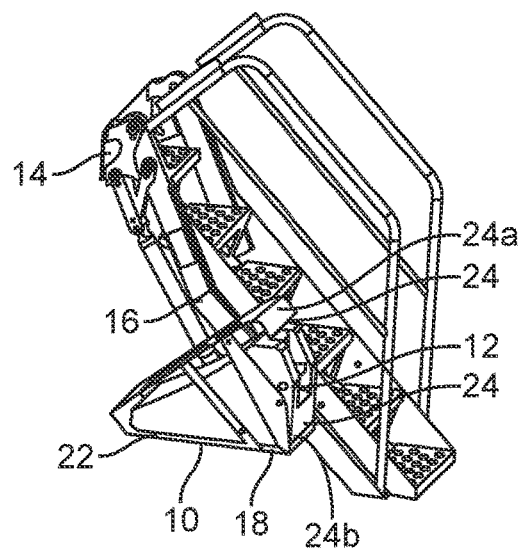
FIGS. 1 to 7 show a holder for wheel chocks according to an embodiment of the present invention, the holder mounted to a side of an access device.
Figure 2:
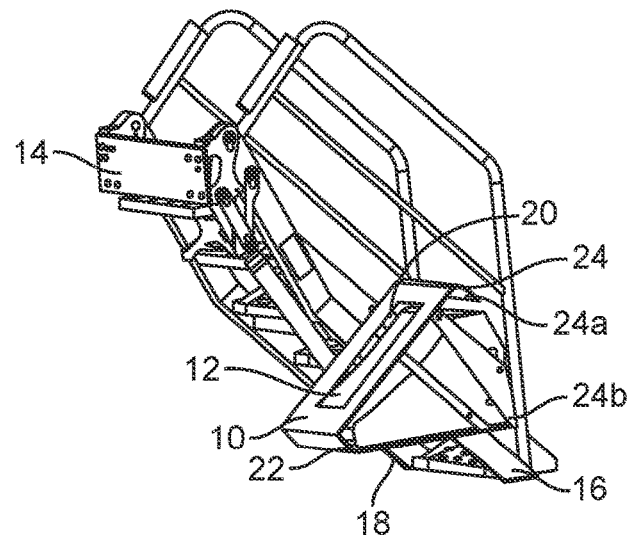
Figure 3:
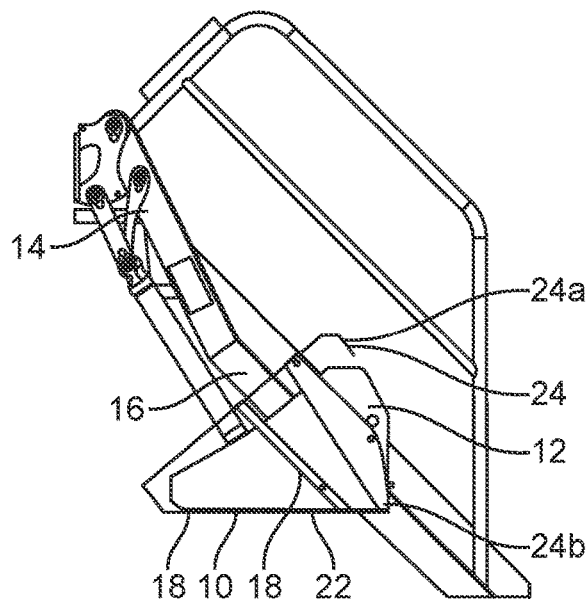
Figure 4:
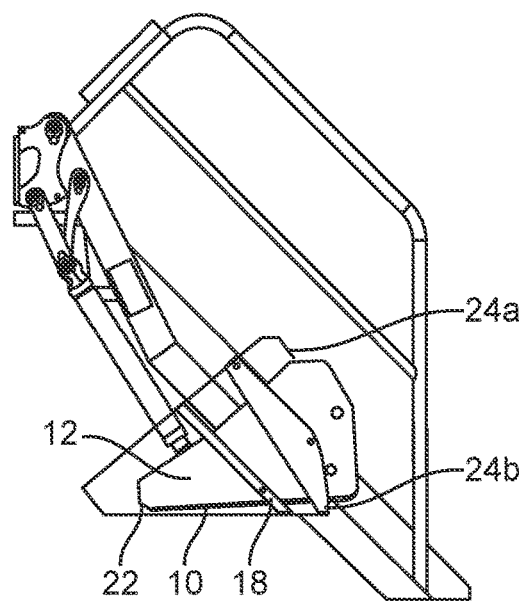

FIGS. 1 to 7 show an embodiment of the present invention providing a holder 10 for one or more wheel chocks 12.

FIGS. 8 to 13 show an embodiment of the present invention providing a holder 100 for a fire extinguisher 121.

The holder is mounted to a side rail 16, 160 of an access device 14, 140 by a unique mounting bracket 12, 120.

Figure 16:
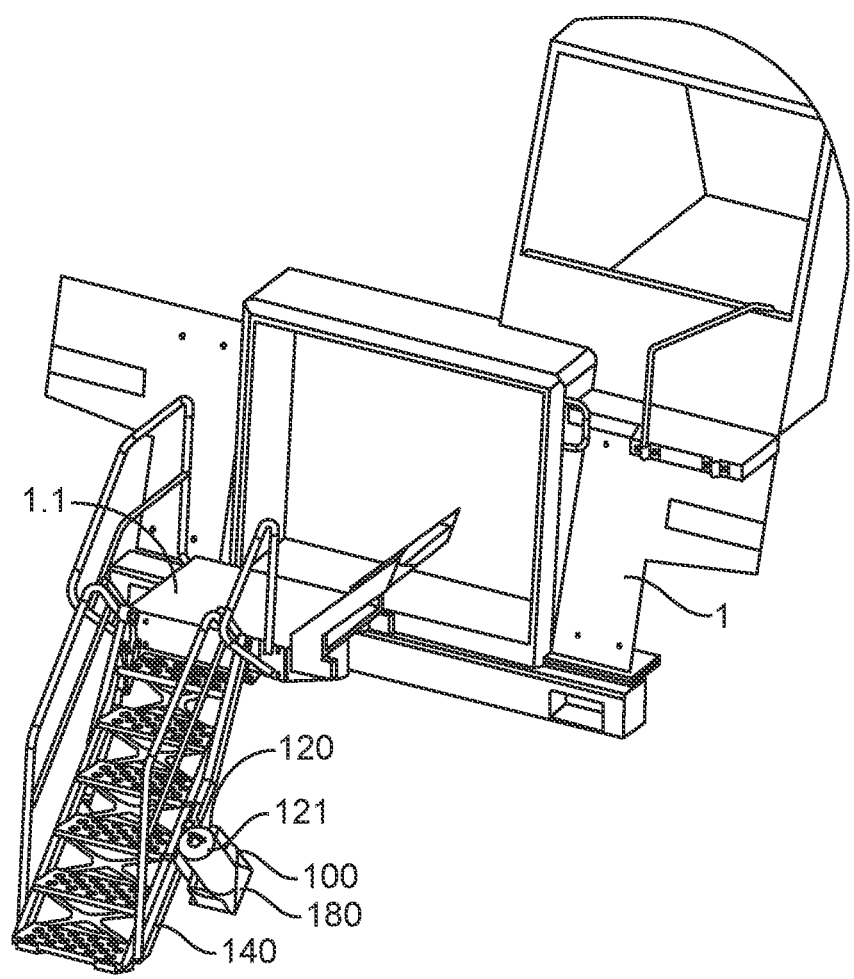
FIG. 16 shows a representative mounting of an access device to a vehicle, the access device shown in a deployed position with respect to the vehicle and including a fire extinguisher holder according to an embodiment of the present invention.
Figure 17:
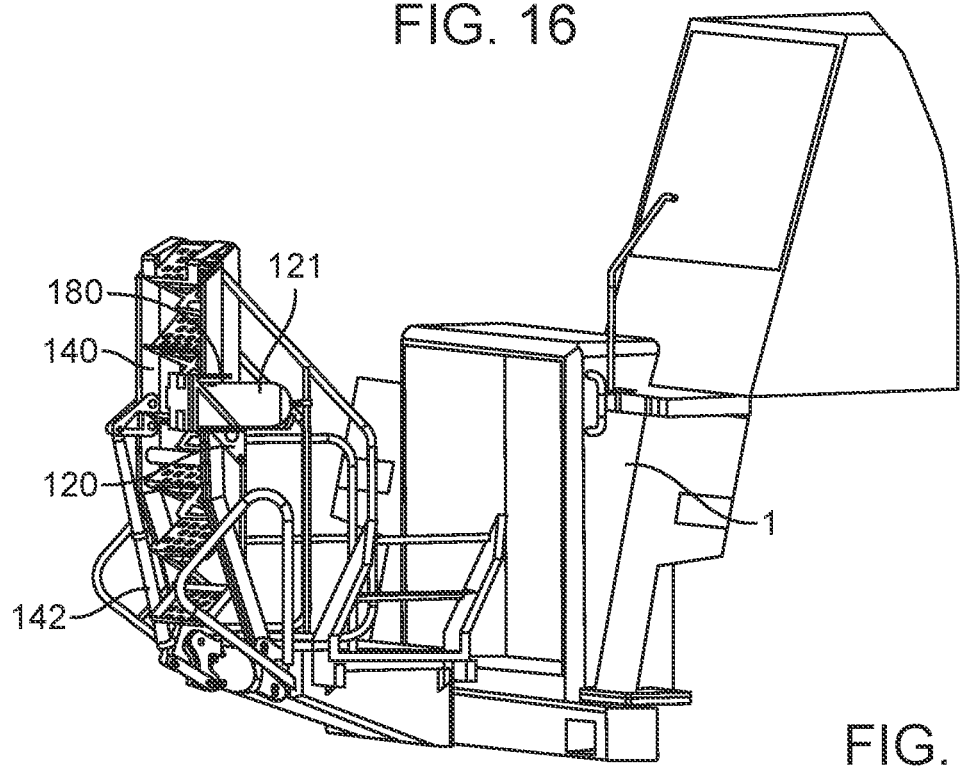
FIG. 17 shows the access device and fire extinguisher holder of FIG. 16 with the access device in a retracted position with respect to the vehicle.

The access device mounts to a vehicle 1, as shown, for example, in FIGS. 14 to 17. The equipment holder can be any embodiment of a holder of the present invention. For example, in FIGS. 14 and 15 the holder is for wheel chocks, whereas the holder shown in FIGS. 16 and 17 is for a fire extinguisher.

Other equipment may be carried in the holder, for example, one or more radio communications handsets, first aid equipment, protective clothing (such as a hard hat, weatherproof jacket) or a tool kit, or combinations of two or more thereof.

The holder 10, 100 includes a cradle or rack 18, 180 mounted to the access device by a mounting bracket 20, 120.

The cradle or rack can have a base 22, 122.

One or more retainers and/or holders stabilisers 24, 124, 24a, 24b, 125, 125a is/are provided to restrain the equipment within the holder.

As shown in FIGS. 1-7, the holder 10 is used for stowage of equipment e.g. wheel chocks 12.

The holder can have a lip 24b as a first retainer to retain the equipment in the holder when the access device 14 is deployed. FIGS. 1-4 show the access device deployed.

Figure 5:
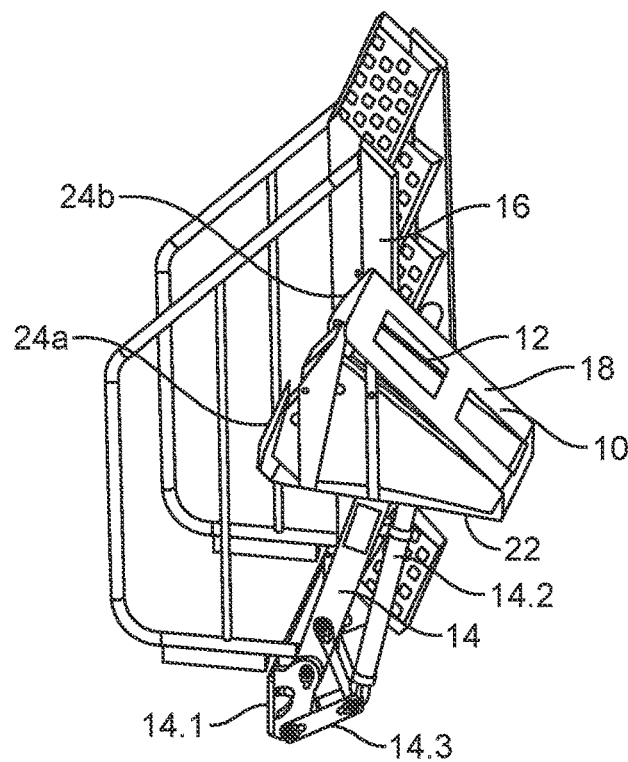
Figure 6:
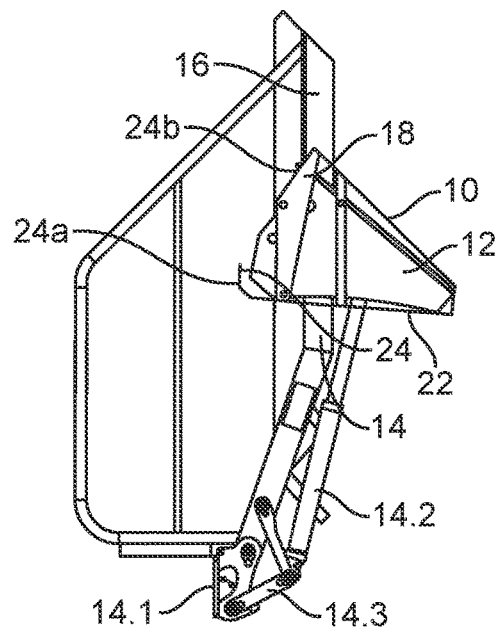
Figure 7:
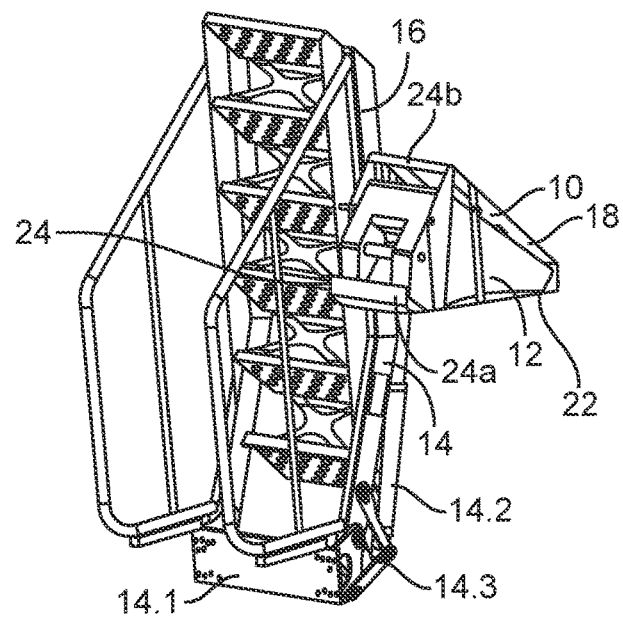
Figure 8:
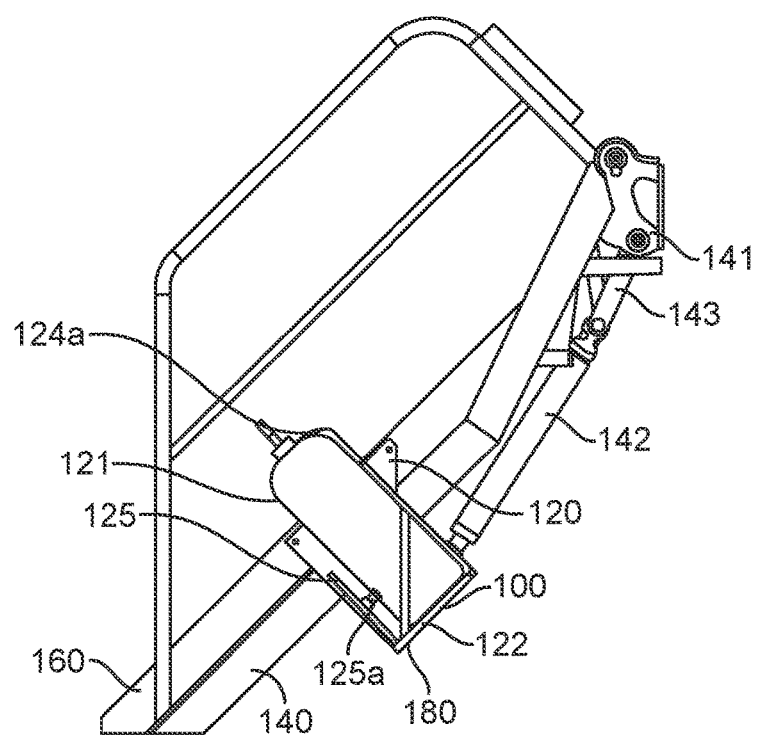
FIGS. 8 to 13 show a holder for a fire extinguisher according to an alternative embodiment of the present invention, the holder mounted to a side of an access device.
Figures 9, 10:
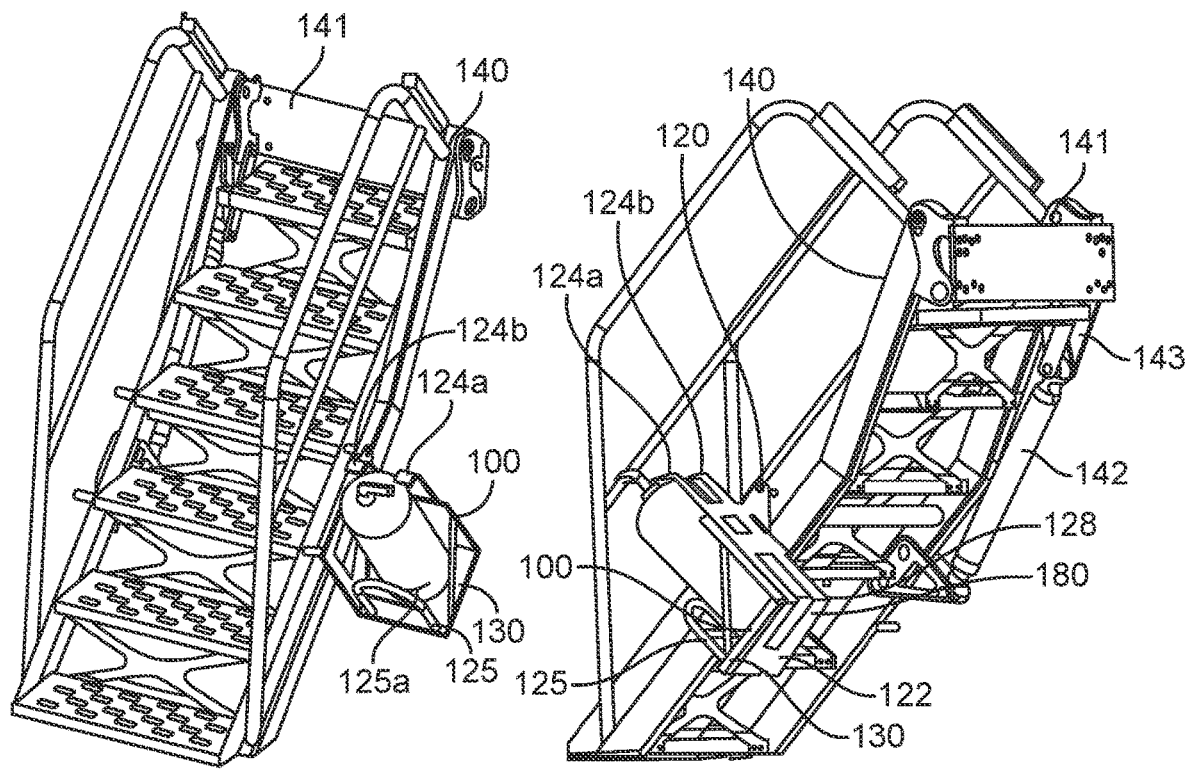
Figure 11:
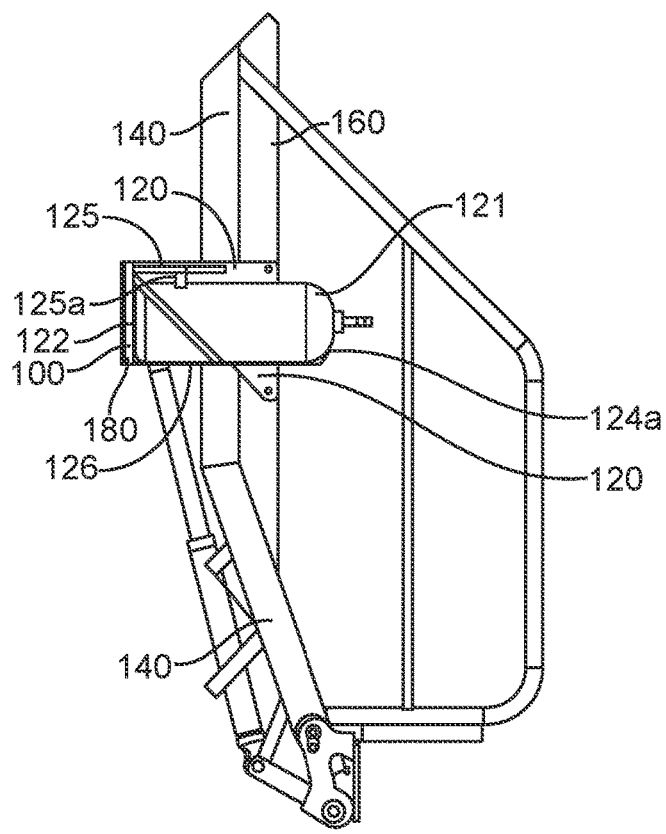
Figure 12:
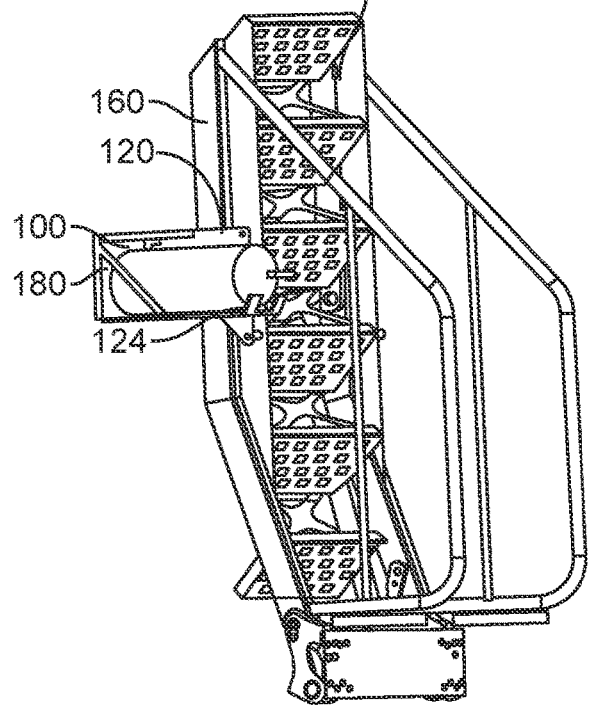
Figure 13:
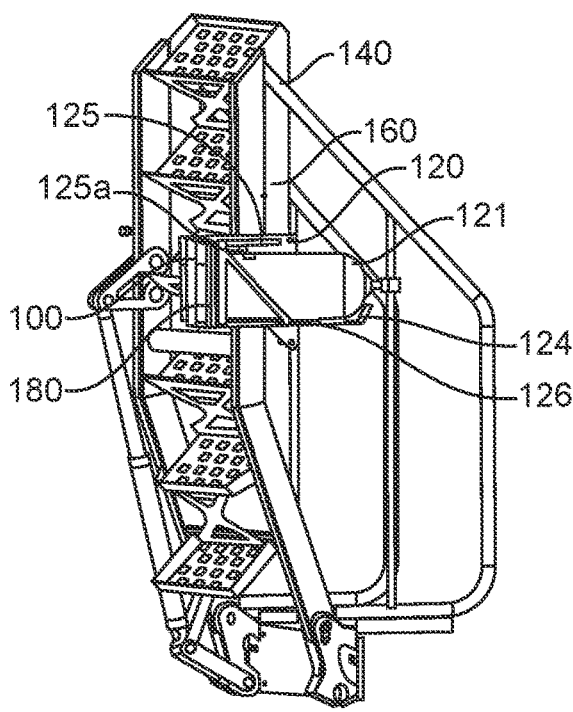
Figure 14:
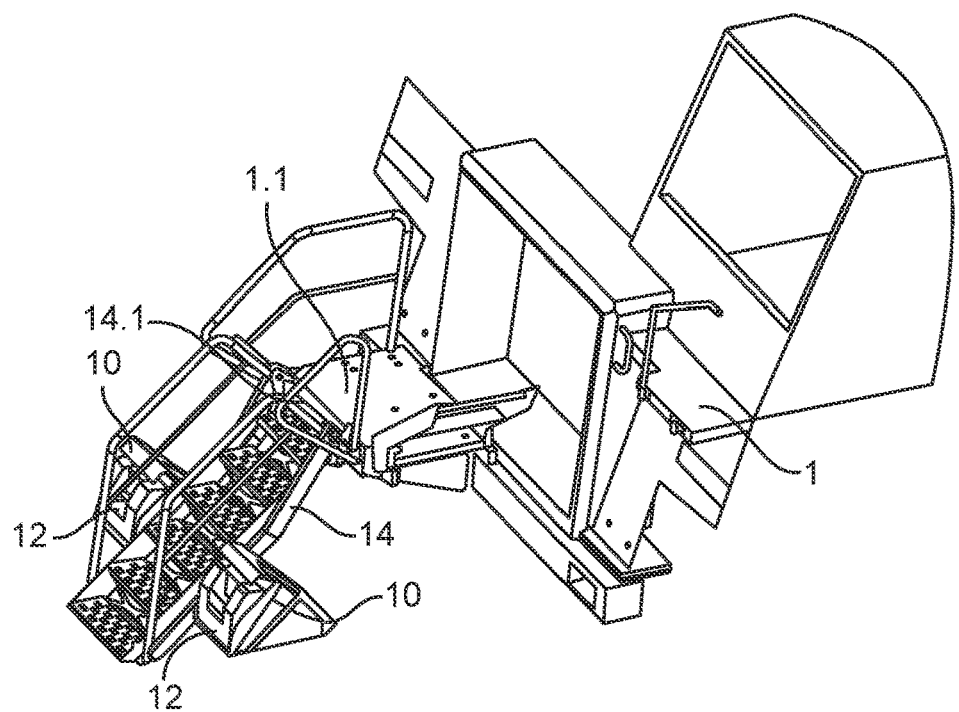
FIG. 14 shows a representative mounting of an access device to a vehicle, the access device shown in a deployed position with respect to the vehicle and including a pair of equipment holders according to at least one embodiment of the present invention provided as wheel chock holders.
Figure 15:
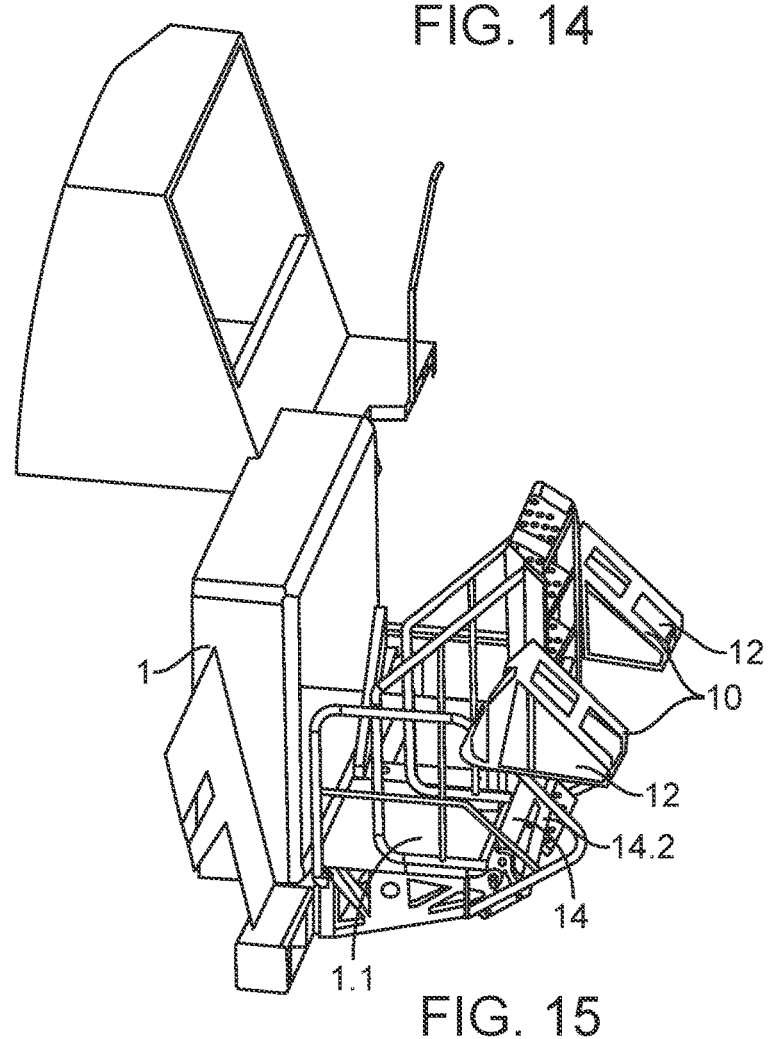
FIG. 15 shows the access device and equipment holders of FIG. 14 but with the access device in a retracted position with respect to the vehicle.

When the access device is retracted to, in this example, an inverted or upright position as shown in FIGS. 5-7, another retainer, the second retainer 24a, arrangement helps prevent accidental removal or slipping of the equipment from the holder.

For either type of retainer 24a, 24b, the equipment has to be lifted clear thereof before being able to be removed from the holder. These retainers prevent accidental loss of the equipment.

Likewise, an alternative form of the second retainer 124 is provided for the fire extinguisher holder embodiment shown in FIGS. 8 to 13. This retainer provides the equivalent of the second retainer 24a in the previous embodiment in relation to wheel chocks when the access device is retracted.

The embodiment shown in FIGS. 8 to 13 also includes an alternative form of the first retainer 125a which acts to bias the fire extinguisher against the rear 126 of the holder. This form of the first retainer can include a biasing means, such as a spring clip or strap arrangement, or a combination thereof. A front protection 125 for the equipment is provided.

The holder as shown has a main support structure, such as an outer support frame 128 for mounting to the access device, and an equipment support structure 130 for receiving and releasably retaining the equipment.

For example, the main support structure can be mounted to a bracket 120 on the access device or may include the bracket 120 to mount the main support structure 128 to the access device.

The main support structure may include the at least one first retainer and/or the at least one second retainer for retaining the equipment.

The equipment support structure 130 may be removable from the main support structure 128. Thus, the equipment may be interchanged for replacement equipment, such as replacing the fire extinguisher in a cradle with a recently tested fire extinguisher.

The main support structure may receive interchangeable equipment support structures, whereby the type equipment to be retained by the holder is interchangeable using the same main support structure.

Thus, the present invention can provide a modular system wherein the type of equipment or alternative number of the same equipment may be interchanged and retained in a main support structure mounted to the access device.

The access device 14, 140 mounts to a vehicle 1, as shown in FIGS. 14 to 17. The access device can have a mounting plate 14.1, 141 by which the access device is mounted to the vehicle 1, such as adjacent a platform 1.1 of the vehicle.

The access device is driven by an actuator 14.2, 142 (such as a hydraulic or pneumatic ram, or an electrically powered device) for retraction (and optionally for deployment, though gravity deployment with optional resistance from the actuator can be employed).

A linkage mechanism 14.3, 143 can be used to translate forces from/to the actuator.

As previously mentioned, an example of such a pivotably deployable/retractable access device is disclosed in international (PCT) patent application number PCT/AU2006/001807 published as WO 2007/062464, the entire contents of which is incorporated herein by reference.

I claim:

1. An equipment holder on a deployable and retractable access device for a vehicle, the equipment holder comprising a stowage for receiving therein portable equipment, the equipment holder configured to move with the deployable and retractable access device during deployment and retraction movements of the deployable and retractable access device, wherein the equipment holder comprises at least one retainer that retains the portable equipment in the equipment holder when the deployable and retractable access device is rotated to an inverted or sideways retracted position.

2. The equipment holder of claim 1, the at least one retainer comprising at least one first retainer retaining the portable equipment when the deployable and retractable access device is in a deployed position until the at least one first retainer is bypassed or released.

3. The equipment holder of claim 2, the at least one retainer comprising at least one second retainer retaining the portable equipment when the deployable and retractable access device is in the inverted or sideways retracted position until the at least one second retainer is bypassed or released.

4. The equipment holder of claim 2, wherein the at least one first retainer is configured to retain the portable equipment when the deployable and retractable access device is in the inverted or sideways retracted position until the at least one first retainer is bypassed or released.

5. The equipment holder of claim 1, comprising at least one elongate member extending across an access region of the equipment holder for accessing the portable equipment to remove the portable equipment from the equipment holder.

6. The equipment holder of claim 5, wherein the at least one elongate member comprises at least one bar, beam, rod or mesh barrier.

7. The equipment holder of claim 2, wherein the at least one first retainer comprises at least one projection preventing the portable equipment from sliding out from the equipment holder.

8. The equipment holder of claim 3, wherein the at least one second retainer comprises at least one projection preventing the portable equipment from sliding out from the equipment holder.

9. The equipment holder of claim 1, wherein the equipment holder is arranged to invert with the deployable and retractable access device as the deployable and retractable access device rotates from a downward and outward deployed position with respect to the vehicle to the inverted retracted position for stowage.

10. The equipment holder of claim 1, wherein the equipment holder is arranged to lay side down with the deployable and retractable access device as the access device rotates from a downward and outward deployed position with respect to the vehicle to the sideways retracted position for stowage alongside the vehicle.

11. The equipment holder of claim 1, wherein the equipment holder is at least a wheel chock holder, or at least a fire extinguisher holder, or at least a combined wheel chock and fire extinguisher holder.

12. The equipment holder of claim 1, comprising a bracket for mounting to the deployable and retractable access device.

13. The equipment holder of claim 12, wherein the bracket comprises one or more fastening points allowing the equipment holder to be fastened to a side of the deployable and retractable access device.

14. The equipment holder of claim 1, comprising at least one releasable tie-down or strap for firmly restraining the portable equipment.

15. The equipment holder of claim 1, comprising a cradle, rack or storage container within which the portable equipment is stored.

16. The equipment holder of claim 1, comprising a main support structure for mounting to the deployable and retractable access device, and an equipment support structure for receiving and releasably retaining the portable equipment.

17. The equipment holder of claim 16, wherein the main support structure is mountable to a bracket on the deployable and retractable access device or comprises the bracket to mount the main support structure to the deployable and retractable access device.

18. The equipment holder of claim 16, wherein the main support structure includes at least one first retainer or at least one second retainer, or includes the at least one first retainer and the at least one second retainer, for retaining the portable equipment.

19. The equipment holder of claim 16, wherein the equipment support structure is removable from the main support structure.

20. The equipment holder of claim 16, comprising a latch and release mechanism to releasably attach the equipment support structure to the main support structure.

* * * * *